(12) United States Patent  
Fairs et al.

(10) Patent No.: US 7,836,461 B2  
(45) Date of Patent: *Nov. 16, 2010

(54) COMPUTER INTERFACE SYSTEM USING MULTIPLE INDEPENDENT HARDWARE AND VIRTUAL HUMAN-COMPUTER INPUT DEVICES AND RELATED ENABLING SUBROUTINES

(75) Inventors: James Fairs, Naperville, IL (US); Vlad Zarney, Calabasas, CA (US); Daniel E. Schaaf, Michigan City, IN (US); Lee A. Mitchell, Du Bois, PA (US)

(73) Assignee: IMI Innovations, Inc., Naperville, IL (US)

( * ) Notice: Subject to any disclaimer, the term of this patent is extended or adjusted under 35 U.S.C. 154(b) by 866 days.

This patent is subject to a terminal disclaimer.

(21) Appl. No.: 11/742,407

(22) Filed: Apr. 30, 2007

(65) Prior Publication Data

US 2008/0082991 A1 Apr. 3, 2008

Related U.S. Application Data

(63) Continuation-in-part of application No. 11/001,328, filed on Nov. 30, 2004.

(60) Provisional application No. 60/553,205, filed on Mar. 15, 2004.

(51) Int. Cl.
*G06F 13/00* (2006.01)
*G06F 3/00* (2006.01)
*G06F 3/048* (2006.01)
*G06F 9/45* (2006.01)

(52) U.S. Cl. .............. 719/321; 719/327; 719/328; 715/762; 715/763; 715/764; 715/765; 715/854; 715/855; 715/856; 710/5; 717/139

(58) Field of Classification Search .............. 719/321, 719/327, 328; 715/762–765, 854–856; 710/5; 717/139

See application file for complete search history.

(56) References Cited

U.S. PATENT DOCUMENTS

| | | | | |
|---|---|---|---|---|
| 5,801,696 | A * | 9/1998 | Roberts | 715/781 |
| 6,262,730 | B1 * | 7/2001 | Horvitz et al. | 715/707 |
| 6,643,721 | B1 * | 11/2003 | Sun | 710/62 |
| 6,938,221 | B2 * | 8/2005 | Nguyen | 715/863 |

\* cited by examiner

*Primary Examiner*—Van H Nguyen  
*Assistant Examiner*—Phoung N Hoang  
(74) *Attorney, Agent, or Firm*—Fernandez & Associates, LLP

(57) ABSTRACT

Improved computer interface system using multiple independent hardware and virtual human-computer input devices and related enabling subroutines is disclosed. Multiple independent data input devices allow users to input data independently from multiple independent data input devices to operating system. Input device driver decodes input from multiple independent input devices. Operating system interface software interprets data from input device driver. Operating system software further generates and controls multiple cursors or control points. Input device aware program obtains and interprets input devices event message, and controls input device aware objects.

14 Claims, 13 Drawing Sheets

COMPUTER INTERFACE SYSTEM USING MULTIPLE INDEPENDENT HARDWARE AND VIRTUAL HUMAN-COMPUTER INPUT DEVICES AND RELATED ENABLING SUBROUTINES

CROSS REFERENCE TO RELATED APPLICATIONS

This application is continuation-in-part of pending U.S. patent application Ser. No. 11/001,328 filed originally on Nov. 30, 2004, which claims the benefit of U.S. Provisional Application No. 60/553,205, filed Mar. 15, 2004, by James R. Fairs, Daniel E. Schaaf, entitled "MULTIPLE INDEPENDENT FULLY FUNCTIONAL GRAPHICAL INPUT DEVICES CONTROLLING MULTIPLE INDEPENDENT FULLY FUNCTIONAL CURSORS AND CONTROL POINTS".

BACKGROUND

1. Field

The invention relates to data input methods and systems supporting multiple independent data input devices, particularly to multiple independent fully functional input devices controlling multiple independent fully functional cursors and control points.

2. Related Art

Conventional data input methods employ single input device and single cursor or control point on operating system interface. Despite the rapid advances in computer processing power and new software and hardware technology, one aspect of data input has not changed appreciably: a single input device, such as mouse, tracking ball, pad, or pen, is utilized for navigation and implementation. The conventional data input method is limited to the extent that it does not support multiple independent cursors for multiple independent input devices.

Prior techniques for multiple data input devices typically use complex and unfamiliar devices instead of standard mouse. Typically the driver for the second data input device is not installed on system level, and thus the input device is not applied globally, or the systems incorporate insufficient and incomplete interface functionality for the user, often disabling or making the primary cursor interface useless. Existing techniques are often dependent on extensive and unwieldy libraries and/or frameworks. Applications wishing to make use of existing systems must be heavily modified to make use of these unwieldy libraries and/or frameworks.

Accordingly, there is a need for improved data input methods and systems allowing users better and faster control of the human-computer interface. Novel methods and systems supporting multiple input devices are described herein.

SUMMARY

An improved computer interface system supporting multiple independent hardware and virtual human-computer input devices and related enabling subroutines is disclosed. The improved computer interface system includes multiple independent input devices, input devices driver, operating system interface software, input device aware program, input device aware objects and multiple independent input devices cursors and control points, multiple screen support for multiple independent input devices cursors and control points, translation subroutines for multiple independent input devices cursors and control points, and advanced methodologies for the implementation of the above specified systems.

A computer-implemented method for supporting multiple input devices, wherein the novel method generates multiple input devices cursors and control points, decodes raw input messages or other fundamental OS device layer data from input devices sources provided by a variety of input methodologies, and generates input devices event message, and converts it to data usable for computer operating system or application programs. Additionally, the novel method presents input device aware program and input device aware objects for allowing user to exploit the functions of the independent input devices.

The improved computer interface system using multiple independent hardware and virtual human-computer input devices and related enabling subroutines is not limited to human-computer input devices that are connected directly to the computer on which the application that the user is interfacing with is executing. Instead a human-computer input device may be connected to a computer (or other device capable of accepting human-computer input including, but not limited to, PDAs, Cellular Phones, Smart Phones, Video Game Systems, other specialized human-computer interface devices, etc.) which in turn is connected via a network (or any wired or wireless communications technology including, but not limited to, Ethernet, Fiber Optic, USB, FireWire, Wifi, Infrared, Blue Tooth, etc.) to another computer (or device capable of accepting such input) on which the application making use of such human input is executing. Said system, connecting multiple human-computer input devices together, will form a network of human-input devices, hereinafter referred to as the 'network framework'.

The underlying network framework shall allow applications to, but is not limited to, send and receive human-computer input device data, application specific data, and data corresponding to the state of the network framework. The simultaneous network framework is divided into three (3) sections: client transmitter, server, and client receiver.

BRIEF DESCRIPTION OF DRAWINGS

The accompanying drawings, which are incorporated in and form a part of this specification, illustrate embodiments of the invention and, together with the description, serve to explain the principles of the invention.

DETAILED DESCRIPTION

This specification describes an improved computer interface system using multiple independent hardware and virtual human-computer input devices and related enabling subroutines. The system allows implementation of multiple cursors or control points under the control of multiple independent data input devices. Reference is made in detail to the preferred embodiments of the invention. While the invention is described in conjunction with the preferred embodiments, the invention is not intended to be limited by these preferred embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, the invention may be practiced without these specific details.

Figure 1:
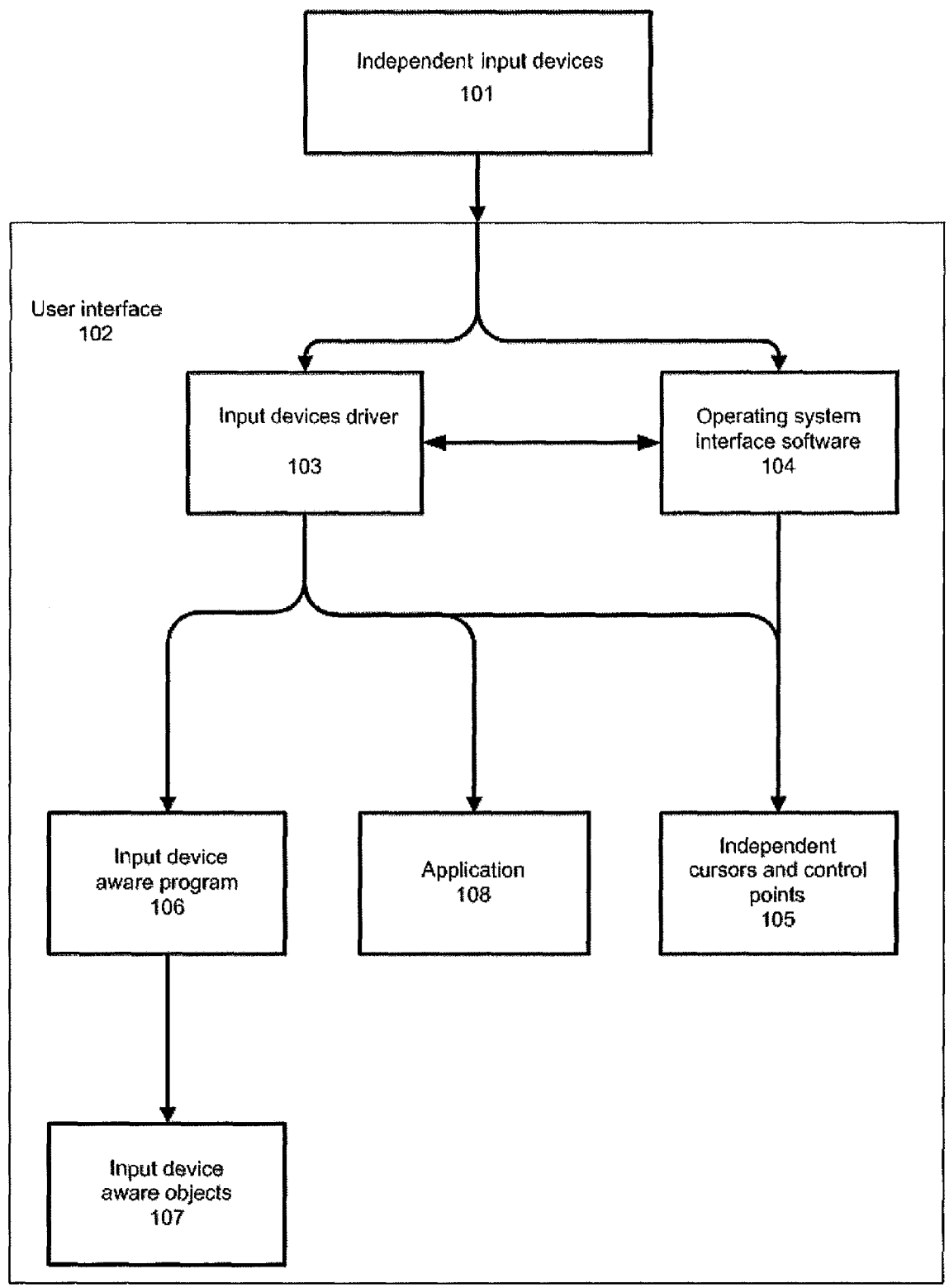
FIG. 1 is a diagrammatic illustration of the improved computer interface system using multiple independent data input devices according to one exemplary implementation of the present invention.

FIG. 1 is a diagrammatic illustration of the improved computer interface system using multiple independent data input devices 101 according to one exemplary implementation of the present invention. As understood herein, the term "input devices" is interpreted and construed broadly to mean any input device or any input functionality, software, hardware, or firmware, which generates continuous or discrete input signal based on human manipulation. Examples of such input devices include, but are not limited to, standard mice, modified mice, touch screens, drawing pads, game controllers, touch pads, keyboards, voice driven input systems, as well as various firmware, etc. Input devices 101 may be connected to the user interface 102 via serial port, USB port, or PS/2 port, or other connection types. Input devices 101 may be connected to the user interface via wire, IR, wireless, or remotely, such as over the internet, and other means. Examples of user interface 102 include, but are not limited to, computer interface, game player interface, ATM interface, various embedded device interfaces such as cell phone interface, personal digital assistants interface, global positioning system interface, etc. User interface 102 accepts as raw input message from input devices based on human manipulation.

Raw input message is then processed by either input devices driver 103 or operating system software 104. Raw input message generally includes positions of the multiple independent input devices 101, movements of the multiple independent input devices 101, and states of other multiple independent input devices elements, such as buttons. Input devices driver 103 takes raw input message and converts it to X/Y coordinate data of the multiple input devices' movements on a plane and states of other device elements. Operating system software 104 also takes raw input message directly from multiple independent input devices 101. Operating system software 104 interacts with input devices driver 103 by sending request to input devices driver 103 for input devices event message and receiving input devices event message from input devices driver 103. Preferably, input devices driver 103 comprises standard system input devices driver, and/or specialized/modified input devices driver. Examples of input devices driver 103 include, but are not limited to, system mouse driver, modified mouse driver, touch screen driver, drawing pad driver, game controller driver, touch pad driver, voice driven input system driver, as well as various firmware drivers, etc.

Independent cursors and control points 105 are generated by operating system software 104 together with input devices driver 103, and are fully under control of movements and states of independent input devices 101. As understood herein, the term "cursors and control points" is interpreted and construed broadly to mean any indicator or marker comprising a movable point on visual display. Examples of cursors and control points include, but are not limited to, cursors, control points, or functionalities embedded within an application, wherein such cursors and control points could be either visible, or could be embedded but not rendered in visible forms. Movements of, and changes on, other states of the cursors and control points under the control of input devices allow user to point to commands or screen positions.

Input devices driver 103 sends input devices event message to application 108 or input device aware program 106. As understood herein, the term "application" is interpreted and construed broadly to mean any application software provided by operating system or installed on operating system, or any application connected to operating system, or any application on the internet or intranet. Input device aware program 106 is designed for users to exploit the functions of the independent input devices 101. Input device aware program 106 interprets the input devices event message from input devices driver 103 and controls input device aware objects 107. Input device aware objects 107 are designed to be aware of independent input devices. Input device aware objects 107 might be designed to be under control of individual independent input devices 101, or a combination of a number of independent input devices 101, or all of independent input devices 101. Preferably, for example, first or first set of input device aware objects 107 are under control of first input device 101, second or second set of input device aware objects 107 are under control of second input device 101, and so on. Optionally, all input device aware objects 107 might be configured to be under control of first input device 101, or second input device 101, or other available input devices 101, or all available input devices 101. As understood herein, the term "input device aware objects" is interpreted and construed broadly to mean any input control objects such as input devices numeric input boxes, input devices scroll bars, input devices menus, other input device aware objects, and numerous spoken voice input device objects.

Figure 2:
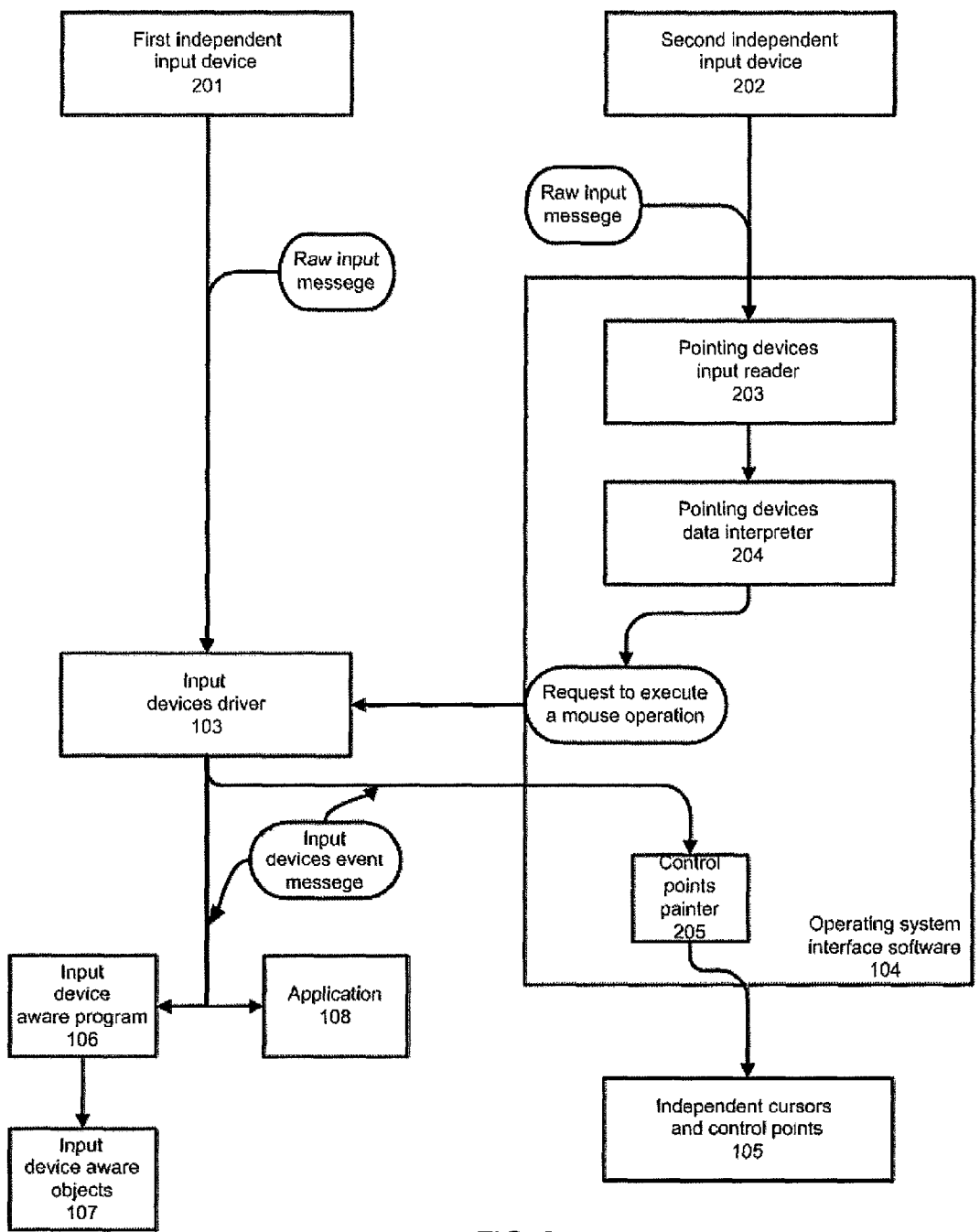
FIG. 2 is a diagrammatic illustration of the processing flow of the system according to one exemplary implementation of the present invention.

FIG. 2 is a diagrammatic illustration of the processing flow of the system according to one embodiment of the implementation of the present invention as shown in FIG. 1. According to this embodiment, an interface system comprising two input devices is illustrated in the figure herein. However, the system and method described for the invention is not limited to a system with two input devices. On the contrary, the invention is intended to cover an interface system utilizing a plurality of input devices.

In FIG. 2, raw input message is sent from first independent input device 201 to input devices driver 103. In the illustrated embodiment, raw input message is also sent from second independent input device 202 to operating system interface 104. In the illustrated embodiment, operating system interface software 104 comprises pointing devices input reader 203, pointing devices data interpreter 204, and control point painter 205. Pointing devices input reader 203 reads in raw input message from second independent input device 202 and sends it to pointing devices data interpreter 204. Examples of pointing devices input reader include, but are not limited to, serial port input reader, USB port reader, PS/2 port reader and/or other types of port reader.

Raw input message is read in by pointing devices input reader 203 and is further processed by pointing devices data interpreter 204. Pointing devices data interpreter 204 first translates data from pointing devices input reader 203 into uniformly formatted data. Pointing devices data interpreter 204 further detects the types of actions generated by second independent input device 202, for example, input devices movement, input devices button state change, or other input devices element state change. Pointing devices data interpreter 204 further translates these input data in order to generate input devices event message.

To programmatically generate input devices event message, pointing devices data interpreter 204 sends a request to execute a mouse operation to input devices driver 103. Input devices driver 103 reads in the data presented by pointing devices data interpreter 204 and converts it to X/Y coordinate data of the multiple input devices movements on a plane and states of other device elements. Upon the request by pointing devices data interpreter 204 to execute a mouse operation, input devices driver 103 sends input devices event message back to operating system interface software 104. Control points painter 205 accepts input devices event message and consequentially generates independent cursors and control points 105.

As illustrated in the embodiment in FIG. 2, input devices event message generated by input devices driver 103 is also received by either input device aware program 106 or application 108. Upon input devices event message, input device aware program 106 controls input device aware objects 107.

Figure 3:
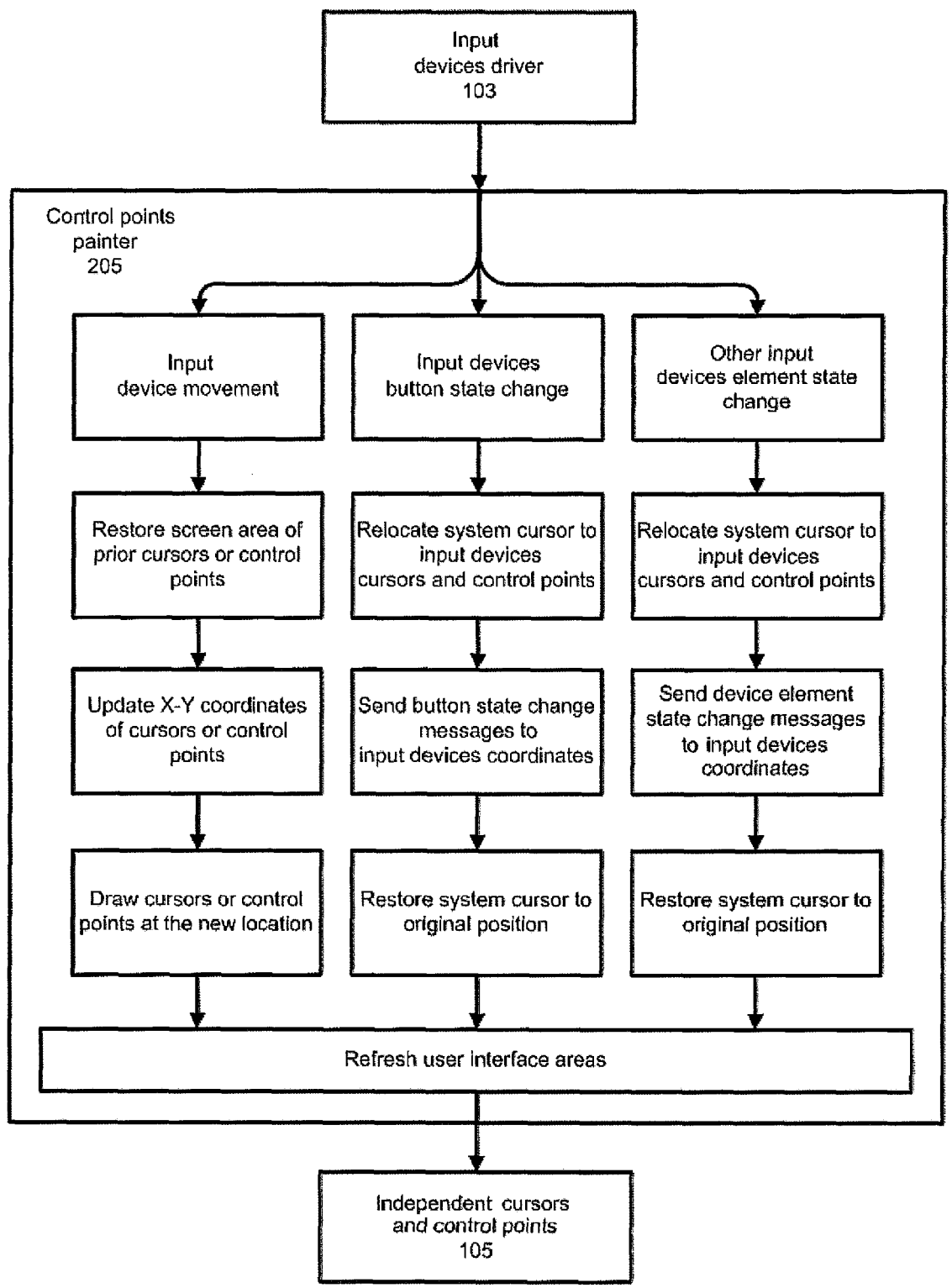
FIG. 3 is a diagrammatic illustration of the processing flow of generating input devices cursors and control points according to one exemplary implementation of the present invention.

FIG. 3 is a diagrammatic illustration of the processing flow of generating input devices cursors and control points according to the embodiment of the present invention as shown in FIG. 2. As illustrated in the implementation in FIG. 3, input devices event message is generated by input devices driver 103 and sent to control points painter 205. Input devices event message comprises input devices movements, input devices button state change, and/or other input devices element state change.

Upon input devices event message, control points painter 205 detects input devices movements. Control points painter 205 restores screen area of prior input devices cursors and control points, updates X-Y coordinates of input devices, and consequentially draws input devices cursors and control points at the new location. Upon input devices event message, control points painter 205 detects input devices button state change. Control points painter 205 relocates system cursor to input devices cursors and control points via application 108 or input device aware program 106. Control points painter 205 sends button state change messages to input devices coordinates via application 108 or input device aware program 106. Upon input devices event message, control points painter 205 detects other input devices element state change. Control points painter 205 relocates system cursor to input devices cursors and control points via application 108 or input device aware program 106. Control points painter 205 sends other input devices element state change messages to input devices coordinates via application 108 or input device aware program 106. At the end of the processes illustrated in the embodiment in FIG. 3, control points painter 205 refreshes user interface area and consequentially regenerates independent input devices cursors and control points 105.

Figure 4:
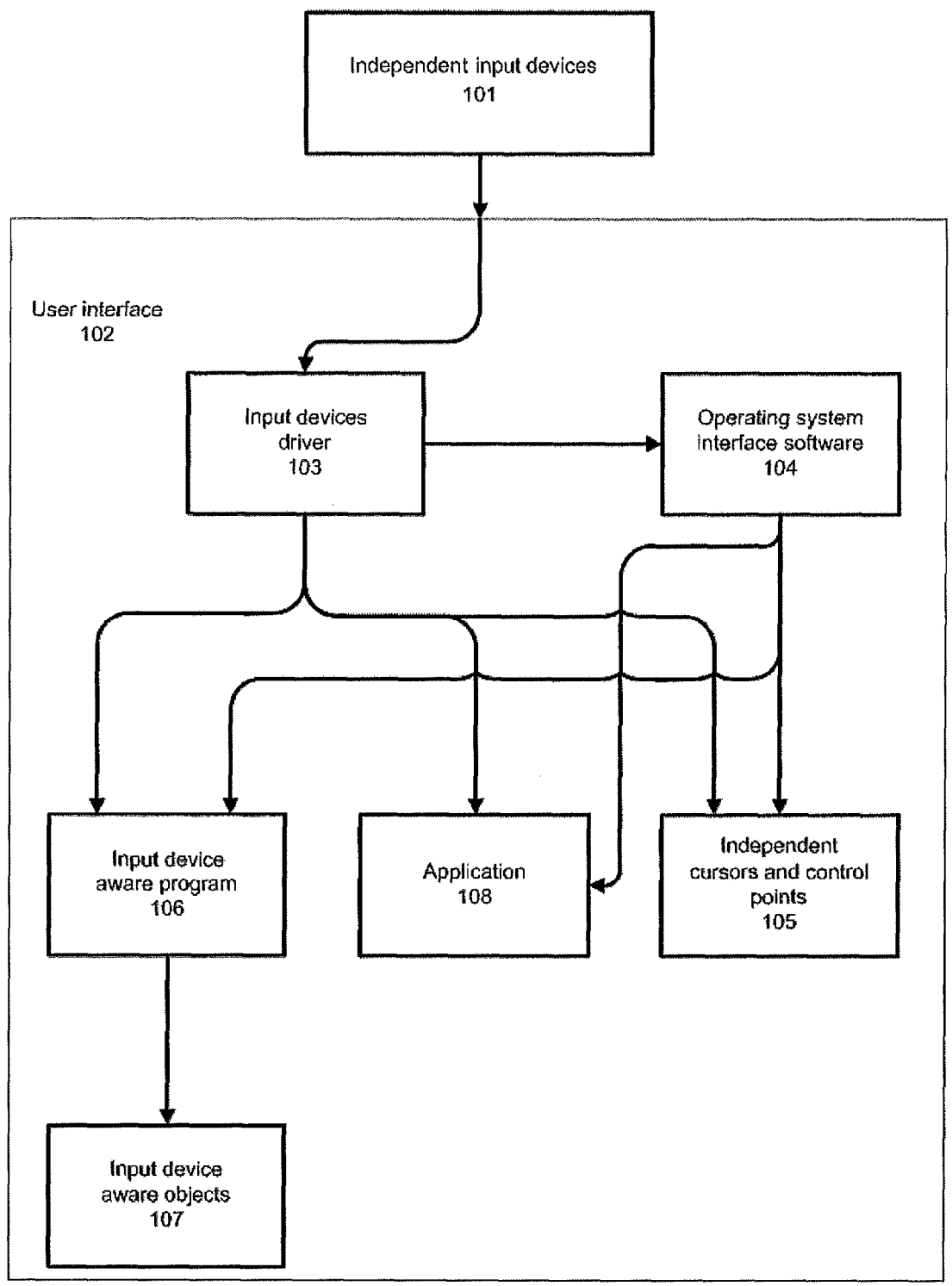
FIG. 4 is a diagrammatic illustration of the improved computer interface system using multiple independent data input devices points according to second exemplary implementation of the present invention.

FIG. 4 is a diagrammatic illustration of the improved computer interface system using multiple independent data input devices 101 according to second implementation of the present invention. Raw input message is processed by input devices driver 103. Input devices driver 103 takes raw input message and converts it to X/Y coordinate data of the multiple input devices movements on a plane and states of other device elements. Input devices driver 103 recognizes the input message, determines which independent input device 101 is attempting to access the operating system and generating the input message, and separates input message according to different independent input device 101 sources. If raw input message is generated by first or first set of independent input devices, input devices driver 103 sends input devices event message to input device aware program 106 and application 108. Input device aware program 106 interprets the input devices event message from input devices driver 103 and controls input device aware objects 107. Independent cursors and control points 105 are generated by input devices driver 103, and are fully under control of movements and states of first or first set of independent input devices 101.

If raw input message is generated by second or second set of independent input devices, or other independent input devices, input devices driver 103 passes raw input message and sends it to operating system software 104. Operating system software 104 takes raw input message from input devices driver 103. Operating system software 104 takes raw input message and converts it to X/Y coordinate data of the multiple input devices movements on a plane and states of other device elements. Operating system software 104 sends input devices event message to input device aware program 106 and application 108. Input device aware program 106 interprets the input devices event message from operating system software 104 and controls input device aware objects 107. Independent cursors and control points 105 is generated by operating system software 104 and is fully under control of movements and states of second or second set of independent input devices 101.

Figure 5:
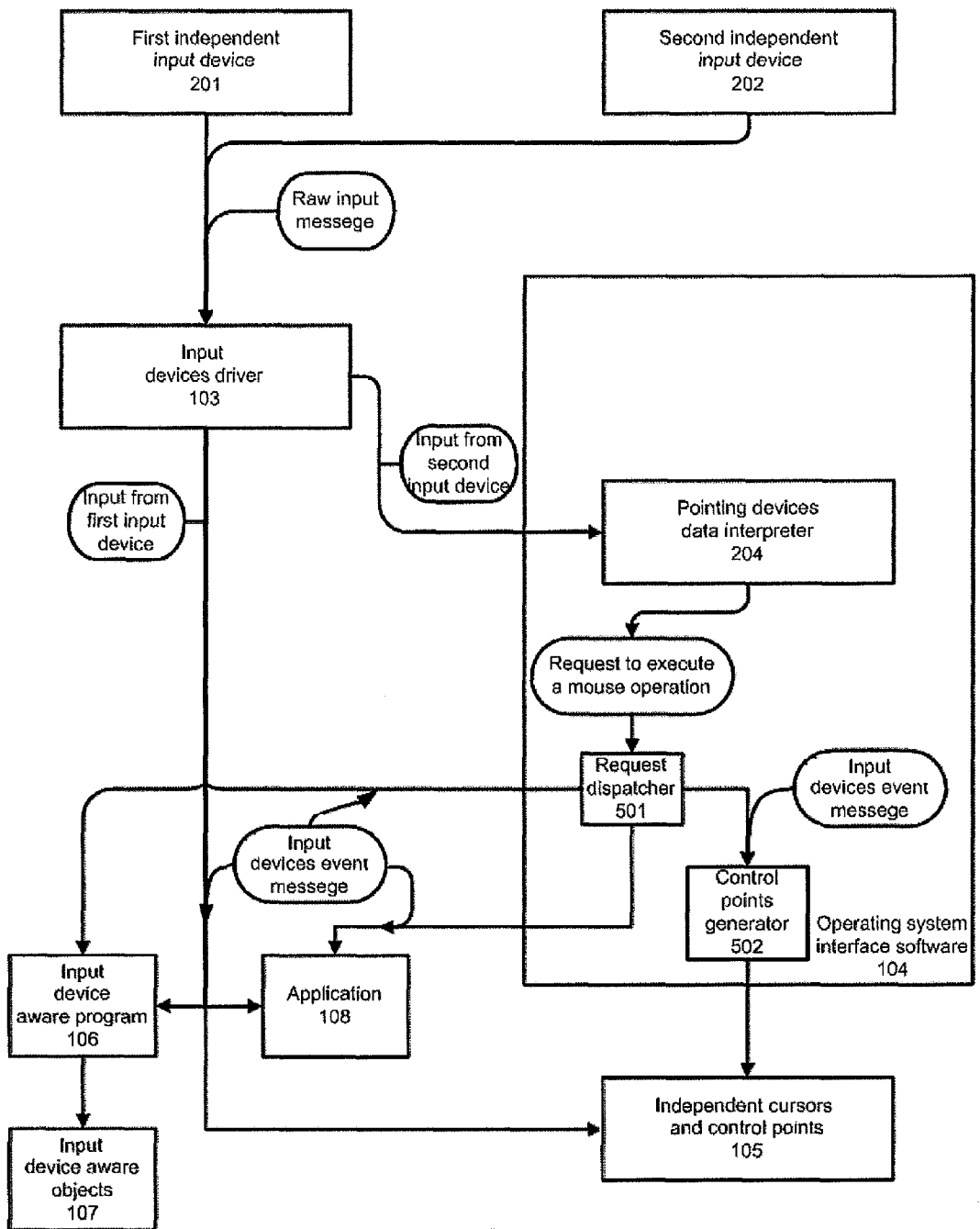
FIG. 5 is a diagrammatic illustration of the processing flow of the system according to second exemplary implementation of the present invention.

FIG. 5 is a diagrammatic illustration of the processing flow of the system according to one embodiment of the implementation of the present invention as shown in FIG. 4. According to this embodiment, an interface system comprising two input devices is illustrated in the figure herein. However, the system and method described for the invention is not limited to a system with two input devices. On the contrary, the invention is intended to cover an interface system utilizing a plurality of input devices.

In FIG. 5, raw input message is sent from the first independent input device 201 to input devices driver 103. Input devices driver 103 independently generates first independent cursor and control point corresponding to first independent input device. Input devices driver 103 generates input devices event message and sends input devices event message to either input device aware program 106 or application 108. Upon input devices event message, input device aware program 106 controls input device aware objects 107.

In the illustrated embodiment, raw input message is also sent from the second independent input device 202 to input devices driver 103. Input devices driver 103 reads in raw input message from the second independent input device 202, and passes raw input message from the second independent input device 202 to operating system software 104. Raw input message from the second independent input device 202 is further processed by operating system interface software 104. In the illustrated embodiment, operating system interface software 104 comprises pointing devices data interpreter 204, control points generator 502, and request dispatcher 501. Pointing devices data interpreter 204 first translates data from input devices driver 103 into uniformly formatted data. Pointing devices data interpreter 204 further detects the types of actions generated by second independent input device 202, for example, input devices movement, input devices button state change, or other input devices element state change. Pointing devices data interpreter 204 further translates these input data in order to generate input devices event message.

To programmatically generate input devices event message, pointing devices data interpreter 204 sends a request to execute a mouse operation to request dispatcher 501. Request dispatcher 501 generates input devices event message and sends it to either input device aware program 106 or application 108. Upon input devices event message, input device aware program 106 controls input device aware objects 107. Request dispatcher 501 also sends input devices event message to control points generator 502. Control points generator 502 accepts input devices event message and consequentially generates independent cursors and control points 105.

Figure 6:
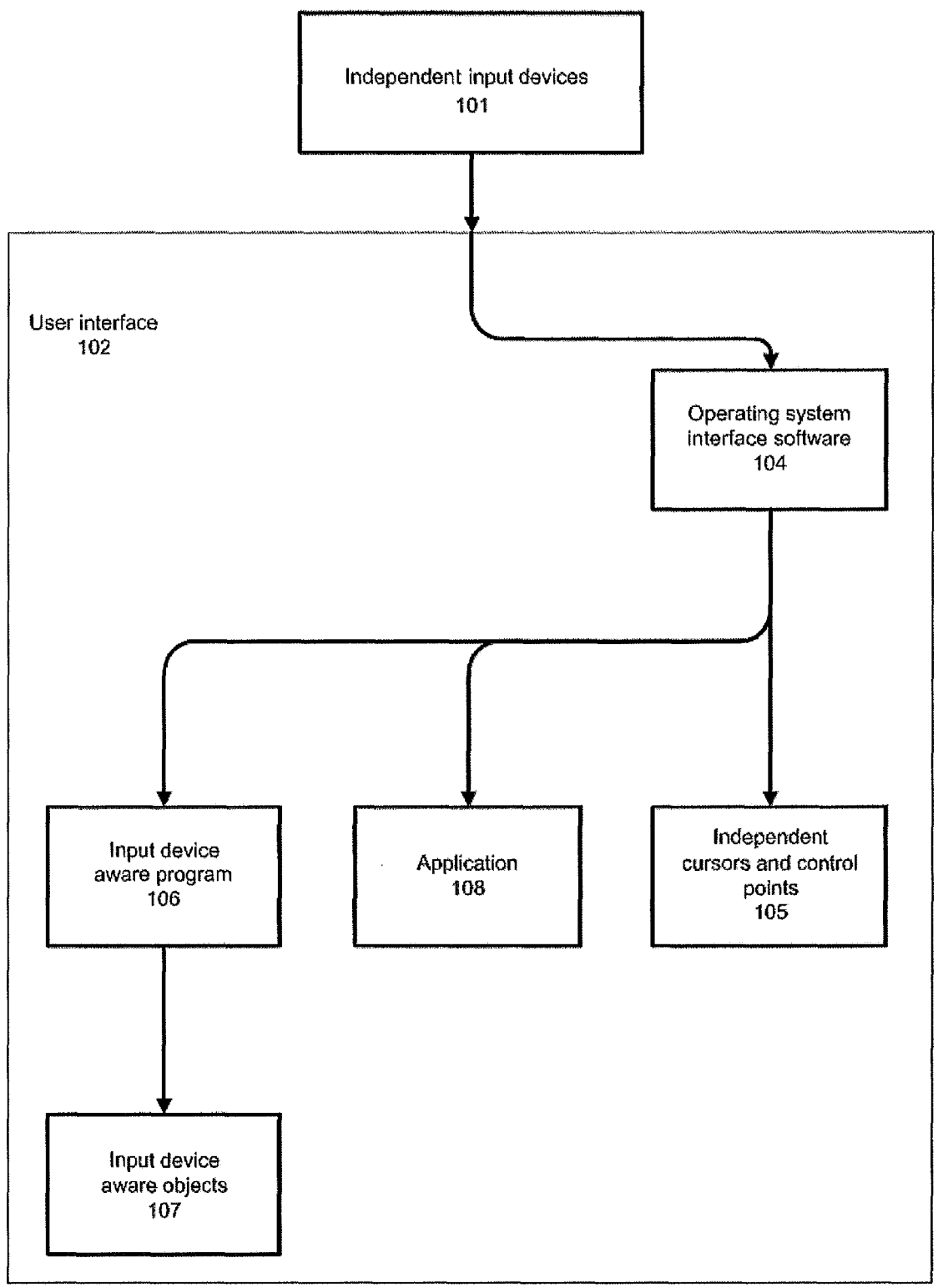
FIG. 6 is a diagrammatic illustration of the improved computer interface system using multiple independent data input devices according to third exemplary implementation of the present invention.

FIG. 6 is a diagrammatic illustration of the improved computer interface system using multiple independent data input devices 101 according to third implementation of the present invention. Raw input message is processed by operating system software 104. Operating system software 104 takes raw input message and converts it to X/Y coordinate data of the multiple input devices movements on a plane and states of other device elements. Operating system software 104 recognizes the input message, determines which independent input device 101 is attempting to access the operating system and generating the input message, and separates input messages according to different independent input device 101 sources. Independent cursors and control points 105 are further generated by operating system software 104, and are fully under control of movements and states of independent input devices 101. Operating system software 104 programmatically generates input devices event message and sends it to input device aware program 106 or application 108. Input device aware program 106 interprets the input devices event message from operating system software 104 and controls input device aware objects 107.

Figure 7:
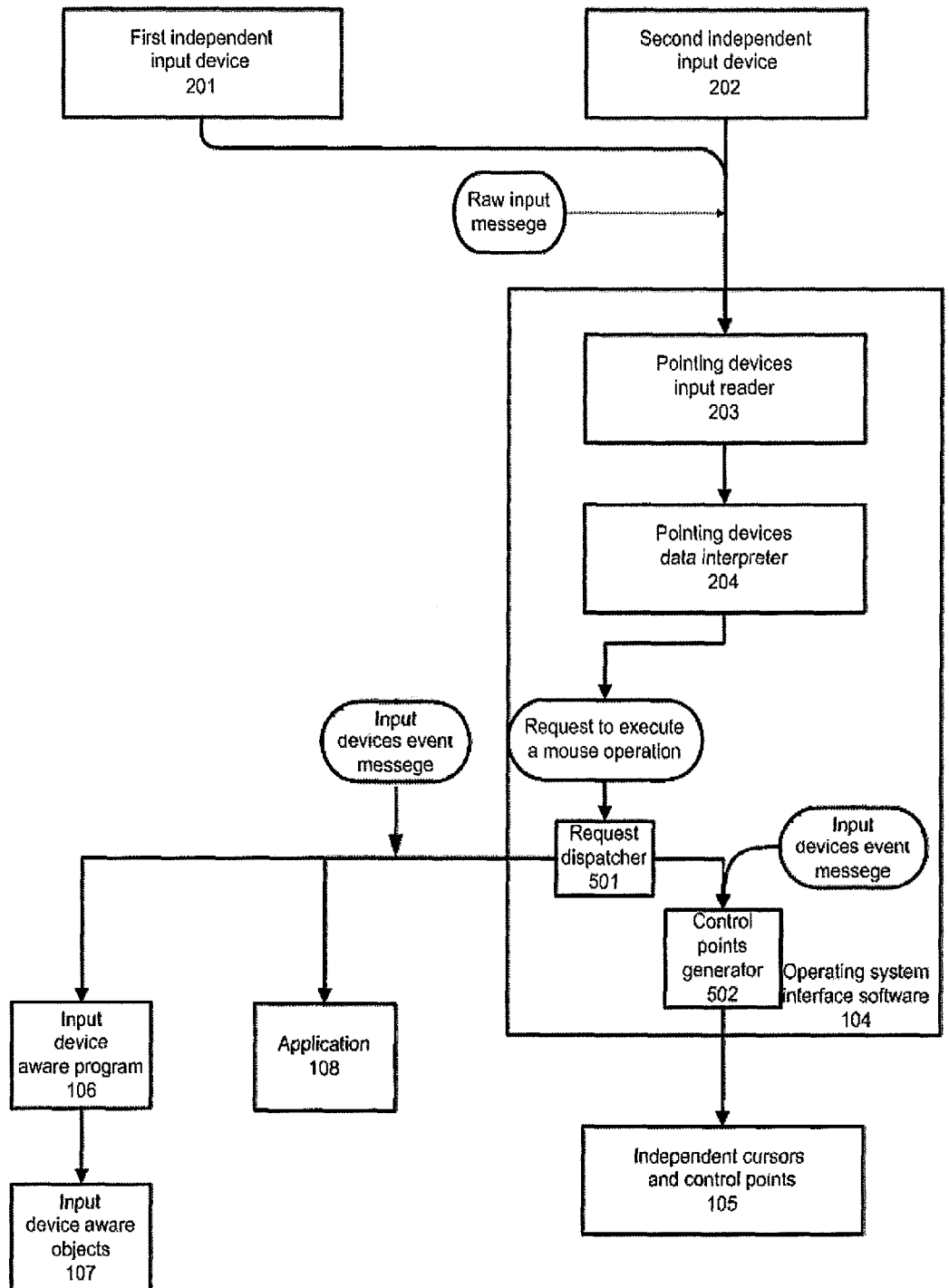
FIG. 7 is a diagrammatic illustration of the processing flow of the system according to third exemplary implementation of the present invention.

FIG. 7 is a diagrammatic illustration of the processing flow of the system according to one embodiment of the implementation of the present invention as shown in FIG. 6. According to this embodiment, an interface system comprising two input devices is illustrated in the figure herein. However, the system and method described for the invention are not limited to a system with two input devices. On the contrary, the invention is intended to cover an interface system utilizing a plurality of input devices.

In FIG. 7, raw input message is sent, independently, from first independent input device 201 and second independent input device 202 to operating system interface software 104. In the illustrated embodiment, operating system interface software 104 comprises pointing devices input reader 203, pointing devices data interpreter 204, request dispatcher 501, and control points generator 502. Pointing devices input reader 203 reads in raw input message from first independent input device 201 and second independent input device 202 and sends it to pointing devices data interpreter 204. Examples of pointing devices input reader include, but not limited to, serial port input reader, USB port reader, PS/2 port reader and/or other types of port reader.

Raw input message is read in by pointing devices input reader 203 and is further processed by pointing devices data interpreter 204. Pointing devices data interpreter 204 first translates data from pointing devices input reader 203 into uniformly formatted data. Pointing devices data interpreter 204 further detects the types of actions generated by first independent input device 201 and second independent input device 202, for example, input devices movement, input devices button state change, or other input devices element state change. Pointing devices data interpreter 204 translates these input data in order to generate input devices event message. Pointing devices data interpreter 204 also recognizes the input message, determines which independent input device is attempting to access the operating system and generating the input message, and separates input message according to different independent input device sources. Pointing devices data interpreter 204 further converts the separated input message to different sets of X/Y coordinate data of the multiple input devices movements on a plane and different sets of states of other device elements according to different independent input device responsible to generating the separated input message.

To programmatically generate input devices event message, pointing devices data interpreter 204 sends a request to execute a mouse operation to request dispatcher 501. Request dispatcher 501 generates input devices event message, according to input from different independent input devices, and sends it to either input device aware program 106 or application 108. Upon input devices event message, input device aware program 106 controls input device aware objects 107. Request dispatcher 501 also sends input devices event message to control points generator 502. Control points generator 502 accepts input devices event message, according to input from different independent input devices, and consequentially generates two independent sets of cursors and control points 105.

Preferably, in embodiments illustrated in FIG. 7, input devices event message from first or first set of independent input device 201 is sent to application 108. And input devices event message from second or second set of independent input device 202 is sent, specifically, to input device aware program 106. Optionally, input devices event message from both independent input devices could be sent to application 108 only, or input device aware program 106 only, or both application 108 and input device aware program 106.

Figure 8:
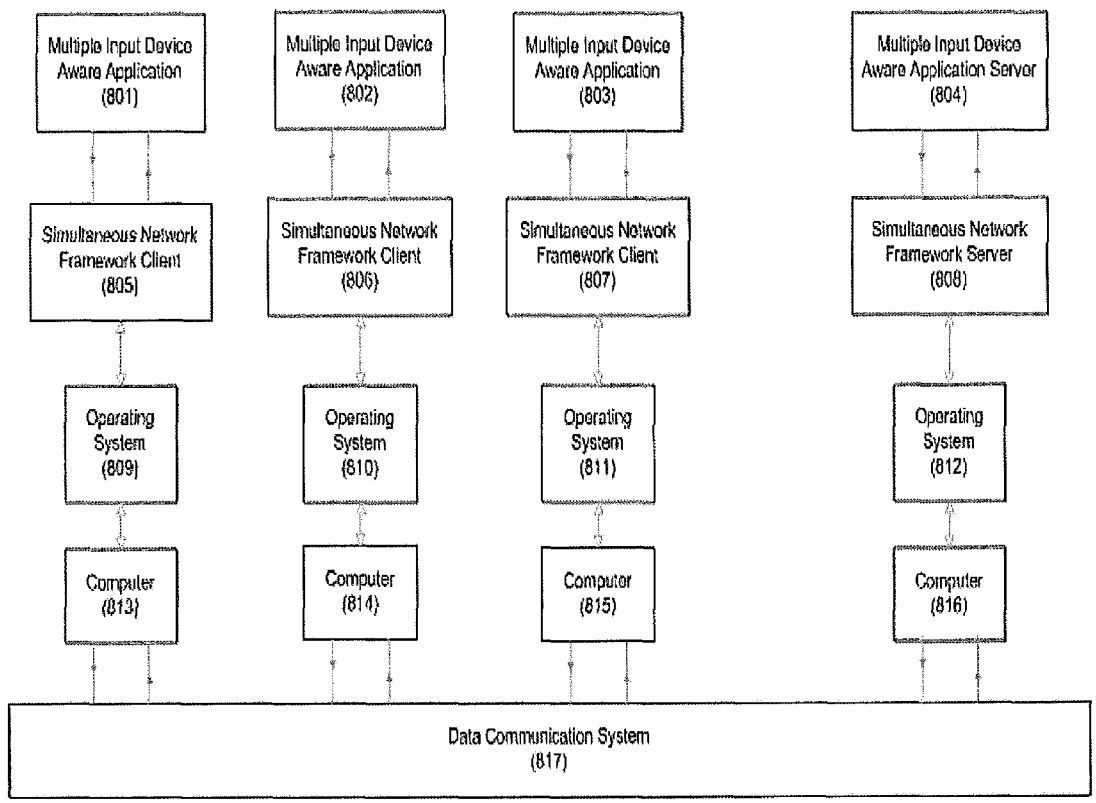
FIG. 8 is a diagrammatic illustration of the Simultaneous Human Input Device Network Framework according to one exemplary implementation of the present invention.

FIG. 8 is a diagrammatic illustration of the Simultaneous Human Input Device Network Framework according to one exemplary implementation of the present invention. Multiple Input Device Aware Applications 801, 802, 803 make use of the Simultaneous Network Framework Client 805, 806, 807, which in turn transmits mouse messages and related data to the Multiple Input Device Aware Application Server 804, by way of their respective operating systems 809, 810, 811 and computer hardware 813, 814, 815. The mouse messages and related data are physically transferred between computers by way of a Data Communication System 817. The Multiple Input Aware Application Server 804 receives the mouse messages and related data from the Simultaneous Network Framework Server 808 which is executing on an Operating System 812 and corresponding computer 816. The Multiple Input Device Aware Application Server then processes and retransmits these mouse messages to all of the clients by way of the Data Communication System 717.

The Multiple Input Device Aware Applications 801, 802, 803 receive the mouse messages and related data from the Multiple Input Device Aware Application Server 804 from the Simultaneous Network Framework Client 805, 806, 807, which is in turn received from the operating system 809, 810, 811, which in turn is received from the Computer 813, 814, 815, which in turn is received from the Data Communication System 817. The Multiple Input Device Aware Applications 801, 802, 803 then process these mouse messages and related data.

Figure 9:
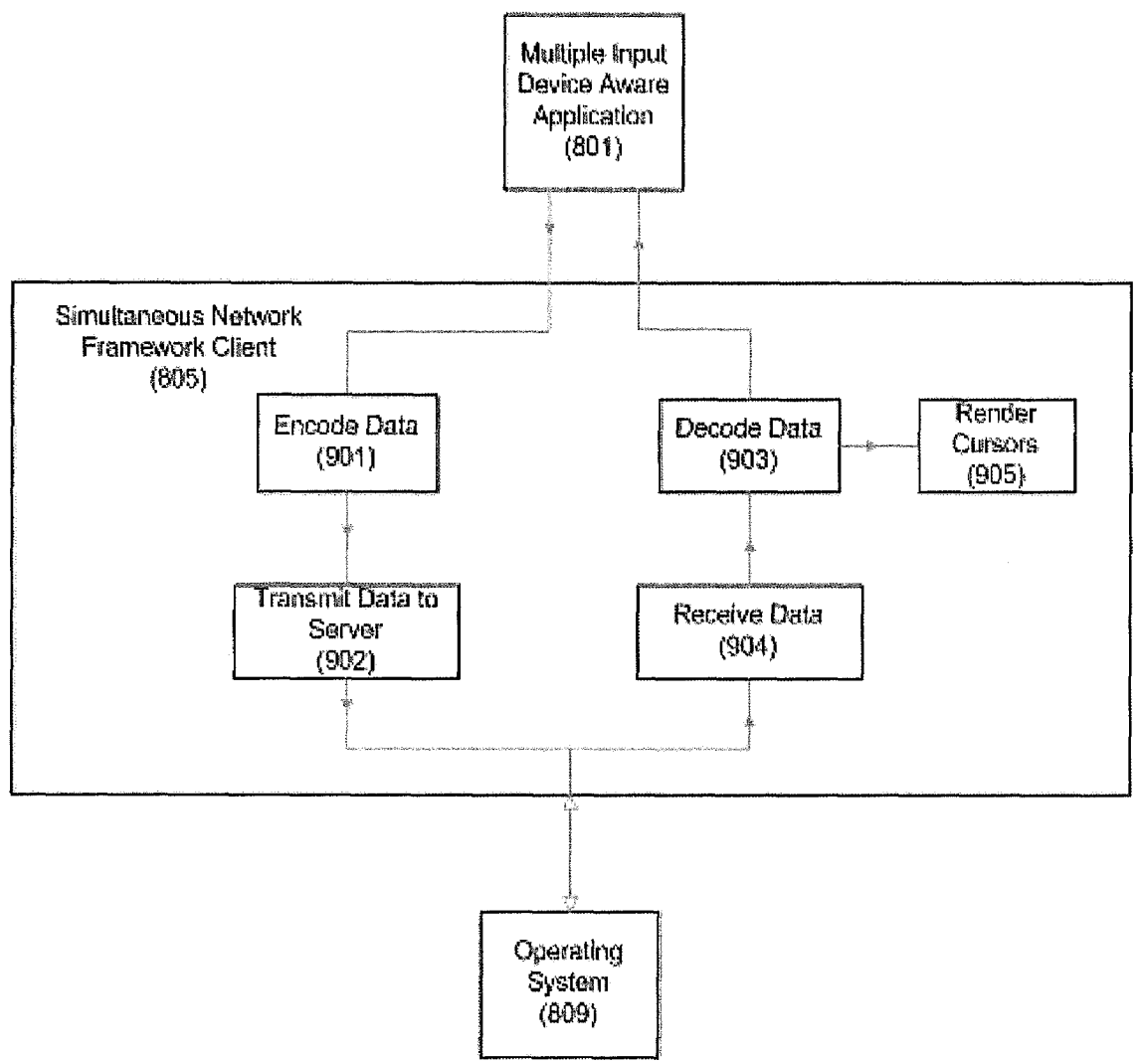
FIG. 9 is a diagrammatic illustration of the Simultaneous Human Input Device Network Framework Client according to second exemplary implementation of the present invention.

FIG. 9 is a diagrammatic illustration of the Simultaneous Human Input Device Network Framework Client according to one exemplary implementation of the present invention. Mouse messages and related data are transferred from the Multiple Input Device Aware Application 801 to the Simultaneous Network Framework Client 805 and are encoded 901 and transmitted to the Simultaneous Network Framework Server 902 by way of the Operating System 809.

Mouse messages and related data are also received 904 from the Operating System 809 and decoded 903. Additional cursors are rendered to the screen according to the mouse messages and related data 905. The decoded mouse messages and related data 903 are passed to the Multiple Input Device Aware Application 801.

Figure 10:
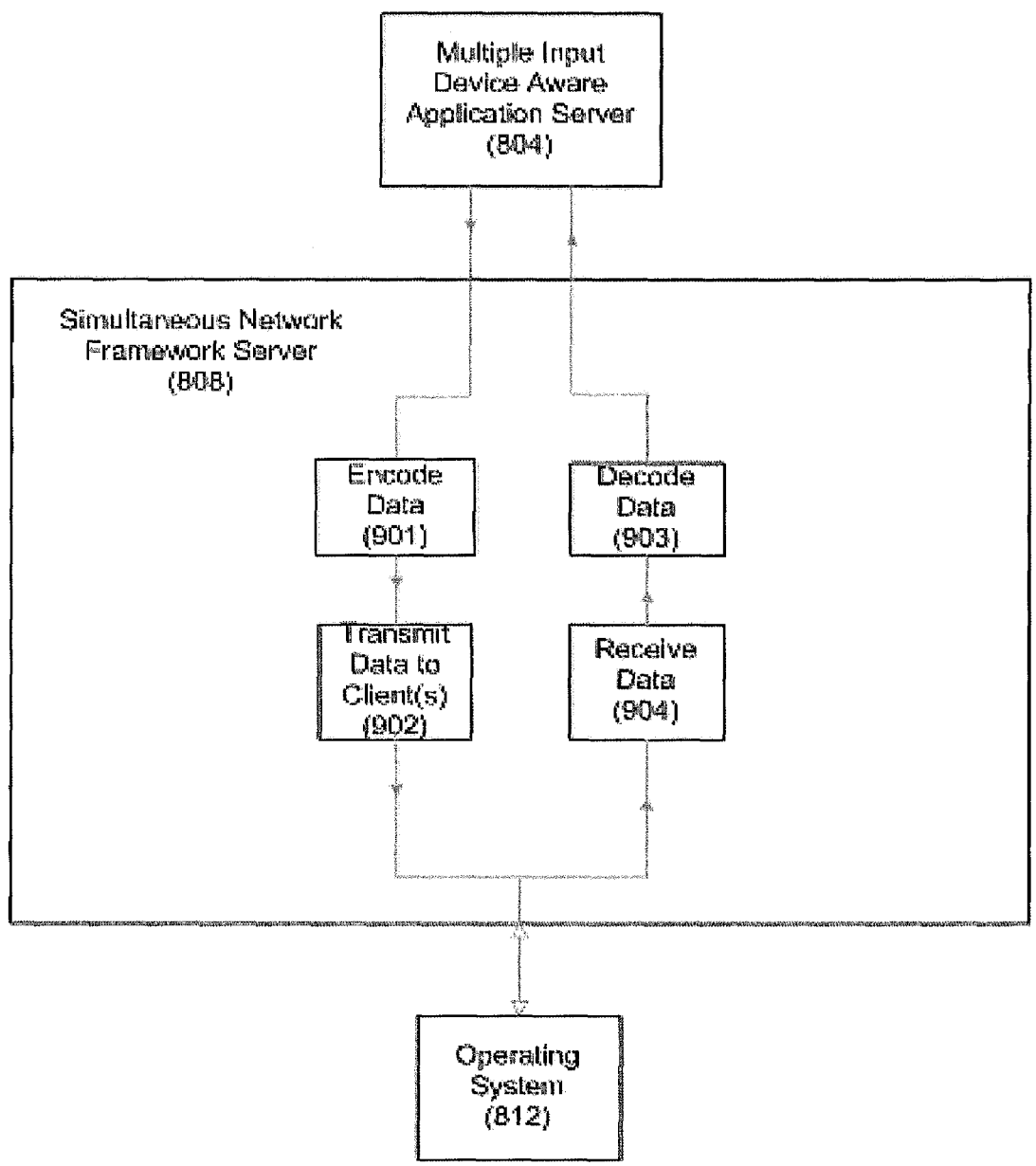
FIG. 10 is a diagrammatic illustration of the Simultaneous Human Input Device Network Framework Server according to third exemplary implementation of the present invention.

FIG. 10 is a diagrammatic illustration of the Simultaneous Human Input Device Network Framework Server according to one exemplary implementation of the present invention. Mouse messages and related data are received 904 from the Operating System 812 and decoded 903. The decoded mouse messages and related data 903 are passed to the Multiple Input Device Aware Application Server 804.

The Multiple Input Device Aware Application Server 804 sends mouse messages and related data to the Simultaneous Network Framework Server 808 where it is encoded 901 and transmitted to the Simultaneous Network Framework Clients 902 by way of the Operating System 812.

Figure 11:
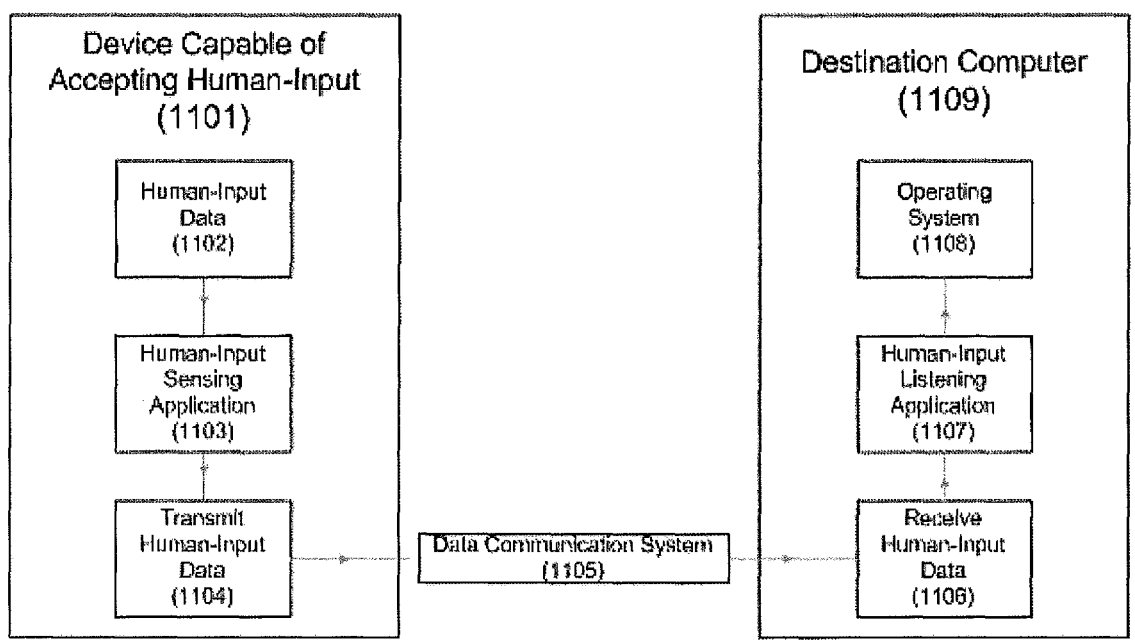
FIG. 11 is a diagrammatic illustration of a the improved computer interface system accepting human input device data and transmitting said data across a data communications interface to a data receiving and translating device wherein said data is interpreted as human input device data according to one exemplary implementation of the present invention.

FIG. 11 is a diagrammatic illustration of a the improved computer interface system accepting human input device data and transmitting said data across a data communications interface to a data receiving and translating device wherein said data is interpreted as human input device data according to one exemplary implementation of the present invention. Illustrated is a Device Capable of Accepting Human-Input 1101. Examples of such devices include, but are not limited to cellular phones, PDAs, smart phones, video game systems, computers, and specialized human input device systems. The Human-Input Data 1102 is passed to the Human-Input Sensing Application 1103 and in turn transmitted 1104 by way of a data communication system 1105 to the destination computer 1109. On the destination computer 1109 the human-input device data is received 1106 and passed to a Human-Input Listening Application 1107 and subsequently forwarded to the operating system 1108.

Figure 12:
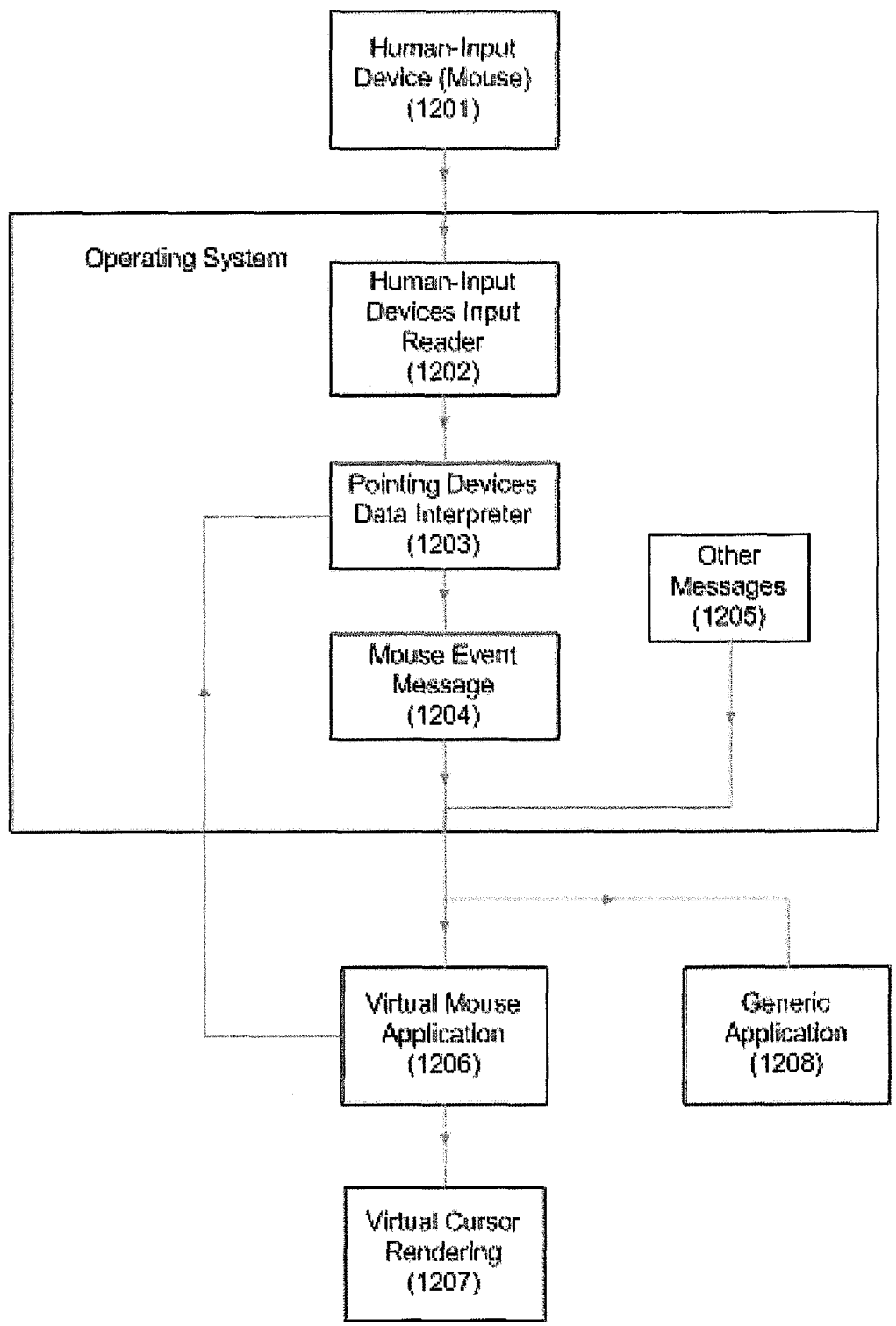
FIG. 12 is a diagrammatic illustration of a system in which multiple cursors are rendered and controlled from a single physical human-input device according to one exemplary implementation of the present invention.

FIG. 12 is a diagrammatic illustration of a system in which multiple cursors are rendered and controlled from a single physical human-input device according to one exemplary implementation of the present invention. Data from a human-input device 1201 is passed to the human-input devices input reader 1202 and onto the pointing devices data interpreter 1203, which generates a mouse event message 1204 that is combined with other messages from the operating system 1205 and sent to applications 1206, 1208. The Virtual Mouse Application 1206 renders virtual cursors 1207 in addition to the primary cursor that is rendered by the operating system. The virtual mouse application sends mouse message data back to the operating system regarding the virtual mice for which the additional cursors have been rendered. The data sent back to the operating system proceeds through the operating system and onto applications in the same way as mouse messages generated by physical human-input devices.

Figure 13:
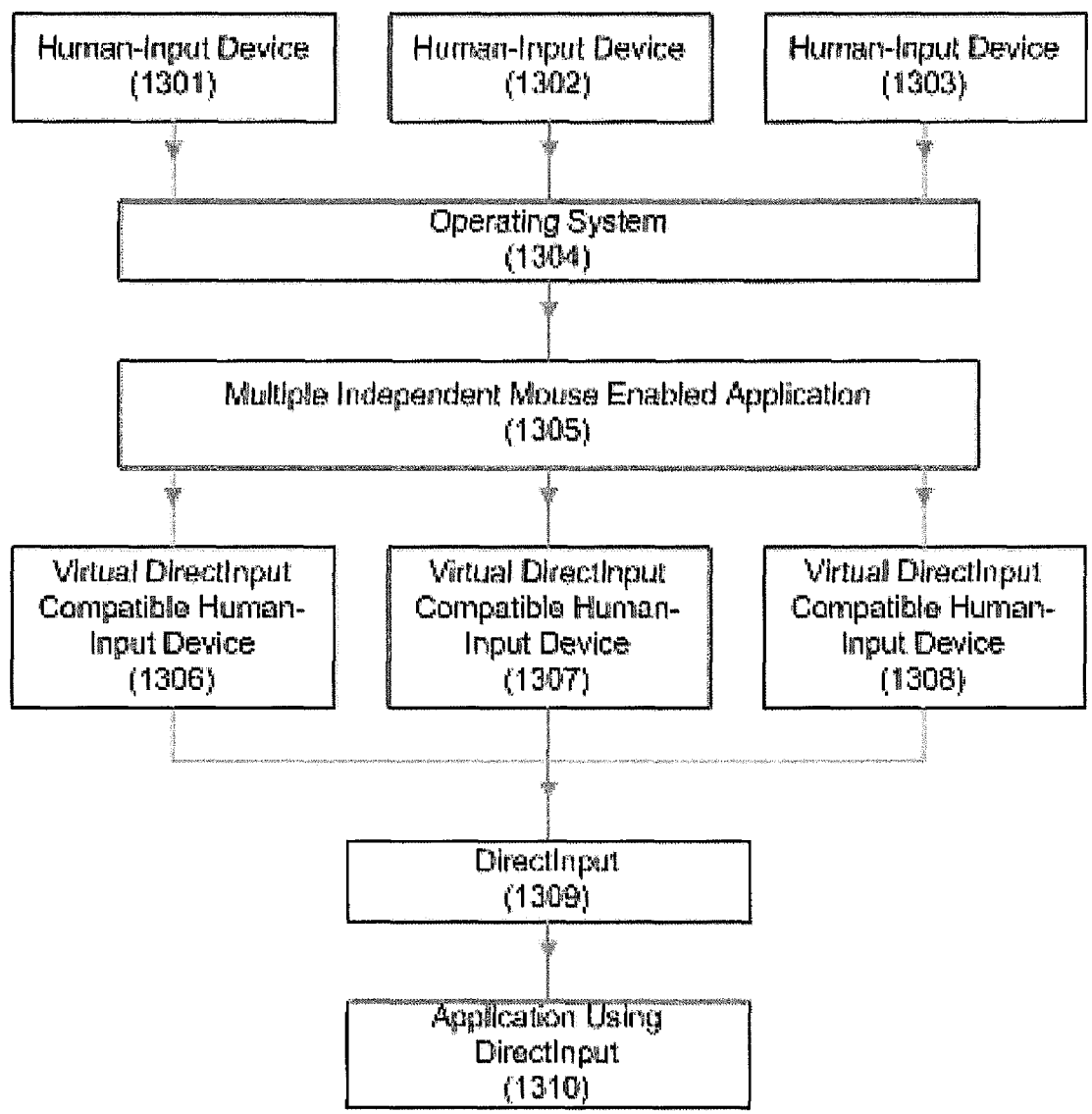
FIG. 13 is a diagrammatic illustration of a system accepting a plurality of human input device data and translating said data into a virtualized Direct Input-compatible human input devices.

FIG. 13 is a diagrammatic illustration of a system accepting a plurality of human input device data and translating said data into a virtualized Direct Input-compatible human input devices. A plurality of human-input devices 1301, 1302, 1303 is seen by the operating system 1304. The operating system forwards the data from these human-input devices to the multiple independent mouse enabled application 1305 where the human-inputs are processed independently. The application 1305 translates and sends the independent human-input data to data appropriate for virtual DirectInput compatible human-input device drivers 1306, 1307, 1308. The data is subsequently passed to the DirectInput 1309 which in turn makes the data available to applications using DirectInput 1310.

Forgoing descriptions of specific embodiments of the invention have been presented for purposes of illustration and description. They are not intended to be exhaustive or to limit the invention to the precise forms disclosed. Modifications and variations are possible in light of the above teaching. Various novel embodiments to present endorsement scheme include, for example: computer system implementing described system and method through a combination of hardware and software for allowing user better and faster control of the input interface wherein multiple independent input devices are integrated in the computer system, e.g. a two-mouse computer or a two-pad laptop; software implementing described system and method allowing user complex realtime data entry to be recorded as a two-handed model by recording data generated by movements of two input devices, wherein one input device manipulating the X-coordinates and the other manipulating the Y-coordinates; software implementing described system and method allowing user to navigate the interface using one input device and to implement using another input device; software implementing described system and method allowing user to navigate through multiple-screen environment; software implementing described system and method allowing each input device or single input device to be attached to specific functionalities within an application; two-handed media mixing console implementing described system and method; home theater system implementing described system and method allowing user to navigate among HDTV setting, DVD player and other setting; stock trading software implementing described system and method allowing user faster speed in navigation and data access; computer game system allowing user entirely new dimensions with entirely new potentials, e.g. a war game allowing user control army movement using one input device, and create diversion using another input device; or other numerous user interface systems used in residential, business, educational, entertainment, military, media, or other working system context wherein multiple input devices are implemented according to present novel scheme describe herein.

The embodiments were chosen and described in order to explain the principles and application of the invention, thereby enabling others skilled in the art to utilize the invention in its various embodiments and modifications according to the particular purpose contemplated. The scope of the invention is intended to be defined by the claims appended hereto and their equivalents.

We claim:

1. An improved computer interface system using multiple independent hardware and virtual human-computer input devices and related enabling subroutines, comprising:
 a user interface;
 a plurality of independent hardware and virtual human-computer input devices, wherein said input devices are connected to said user interface;
 an operating system interface software, wherein said operating system interface software reads and interprets data from said input devices, said operating system interface software generates request for hardware and virtual human-computer input devices event message; and
 a hardware and virtual human-computer input devices driver, wherein said input devices driver decodes input messages from said input devices, said input devices driver generates input devices event message and converts it to data usable for computer operating system or application programs, said input devices driver accepts request from said operating system interface software for input devices event message, said input devices driver generates said input devices event message and sends it to said operating system interface software.

2. The system in claim 1 further comprising:
 a plurality of associated independent hardware and virtual human-computer input device cursors and control points, wherein said cursors and control points are generated, respectively, by said input devices driver and by said operating system interface software upon receiving said input devices event message from said input devices driver; positions, movements, and states of said cursors and control points are controlled, respectively, by said input devices driver and by said operating system interface software.

3. The system in claim 1 further comprising:
 a hardware and virtual human-computer input devices aware program, wherein said input device aware program is designed for users to utilize functions of said input devices, said input device aware program interprets data from said input devices driver; and a plurality of input device aware objects, wherein said input device aware objects are under control of said input device aware program, said input device aware program sends said input devices event message to said input device aware objects.

4. The system in claim 1 further comprising: in the hardware and virtual human-computer input devices driver, means for translation of physical and virtual input device data, wherein the said operating system or applications receive the input data, the source of which input device data is a different type of input device, generating a different language or protocol.

5. The system in claim 1, wherein said hardware and virtual human-computer input devices driver is coupled with an application, said application is adapted to utilize functions of said input devices, application objects or application functionalities within said application are controlled by said input devices driver.

6. A computer interface system for using a plurality of independent hardware and virtual human-computer input devices and for generating a plurality of independent cursors and control points, comprising:
 a user interface;
 a plurality of independent input devices, wherein said input devices are connected to said user interface;
 an operating system interface software, wherein said operating system interface software reads and interprets data from said input devices, said operating system interface software generates request for input devices event message;
 an input devices driver, wherein said input devices driver decodes input messages from said input devices, said input devices driver generates input devices event message and converts it to data usable for computer operating system or application programs, said input devices driver accepts request from said operating system interface software for input devices event message, said input devices driver generates said input devices event message and sends it to said operating system interface software; and
 a plurality of independent cursors and control points, wherein said cursors and control points are generated, respectively, by said input devices driver and by said operating system interface software upon receiving said input devices event message from said input devices driver; positions, movements, and states of said cursors and control points are controlled, respectively, by said input devices driver and by said operating system interface software;
 wherein said multiple independent hardware and virtual human-computer input devices driver is coupled with an application, said application is adapted to utilize functions of said input devices, application objects or application functionalities within said application are controlled by said input devices driver.

7. The system in claim 6 further comprising:
 a plurality of associated independent cursors and control points, wherein said cursors and control points are controlled by a single (or any number less than the total number of) physical or virtual input devices.

8. A computer interface system for using a hardware and virtual human-computer input devices and for generating a plurality of independent cursors and control points, comprising:
 a user interface;
 a plurality of independent input devices, wherein said input devices are connected to said user interface;
 an operating system interface software, wherein said operating system interface software reads and interprets data from said input devices, said operating system interface software generates request for input devices event message;
 a hardware and virtual human-computer input devices driver, wherein said input devices driver decodes input messages from said input devices, said input devices driver input devices event message and converts it to data usable for computer operating system or application programs, said input devices driver accepts request from said operating system interface software for input devices event message, said input devices driver generates said input devices event message and sends it to said operating system interface software;
 a plurality of independent cursors and control points, wherein said cursors and control points are generated, respectively, by said input devices driver and by said operating system interface software upon receiving said input devices event message from said input devices driver; positions, movements, and states of said cursors and control points are controlled, respectively, by said input devices driver and by said operating system interface software;

an input device aware program, wherein said input device aware program is designed for users to utilize functions of said input devices, said input device aware program interprets data from said input devices driver; and a plurality of input device aware objects, wherein said input device aware objects are under control of said input device aware program, said input device aware program sends said input devices event message to said input device aware objects.

9. A computer interface system using multiple independent hardware and virtual human-computer input devices and related enabling subroutines, comprising:

a user interface;

a plurality of independent input devices, wherein said input devices are connected to said user interface;

an input devices driver, wherein said input devices driver decodes input messages from said input devices, said input devices driver separates input messages into different subsets according to the sources of said input devices that generates said input messages, for the first subset of said input message, said input devices driver generates input devices event message and converts it to data usable for computer operating system or application programs, said input devices driver also reads in other subsets of said input messages; and an operating system interface software, wherein said operating system interface software reads and interprets data of other subset of said input messages from said input devices driver, said operating system interface software decodes said input messages from said input devices driver, said operating system interface software generates input devices event message and converts it to data usable for computer operating system or application programs; and an input device aware program, wherein said input device aware program is designed for users to utilize functions of said input devices, said input device aware program interprets data, respectively, from said operating system interface software and said input devices driver; and a plurality of input device aware objects, wherein said input device aware objects are under control of said input device aware program, said input device aware program sends said input devices event message to said input device aware objects.

10. The system in claim 9 further comprising:

a plurality of independent cursors and control points, wherein said cursors and control points are generated, respectively according to different said input devices, by said operating system interface software and said input devices driver, positions, movements, and states of said cursors and control points are controlled, respectively, by said operating system interface software and said input devices driver.

11. The system in claim 9, wherein said input devices driver or said operating system interface software is coupled with an application, said application is adapted to utilize functions of said input devices, application objects or application functionalities within said application are controlled by said input devices driver or said operating system interface software.

12. A computer interface system using multiple independent hardware and virtual human-computer input devices and related enabling subroutines, comprising:

a user interface;

a plurality of independent input devices, wherein said input devices are connected to said user interface;

an input devices driver, wherein said input devices driver decodes input messages from said input devices, said input devices driver separates input messages into different subsets according to the sources of said input devices that generates said input messages, for the first subset of said input message, said input devices driver generates input devices event message and converts it to data usable for computer operating system or application programs, said input devices driver also reads in other subsets of said input messages;

an operating system interface software, wherein said operating system interface software reads and interprets data of other subset of said input messages from said input devices driver, said operating system interface software decodes said input messages from said input devices driver, said operating system interface software generates input devices event message and converts it to data usable for computer operating system or application programs; and a plurality of independent cursors and control points, wherein said cursors and control points are generated, respectively according to different said input devices, by said operating system interface software and said input devices driver, positions, movements, and states of said cursors and control points are controlled, respectively, by said operating system interface software and said input devices driver;

wherein said input devices driver or said operating system interface software is coupled with an application, said application is adapted to utilize functions of said input devices, application objects or application functionalities within said application are controlled by said input devices driver or said operating system interface software.

13. A computer interface system for using a plurality of independent input devices and for generating a plurality of independent cursors and control points, comprising:

a user interface;

a plurality of independent input devices, wherein said input devices are connected to said user interface;

an input devices driver, wherein said input devices driver decodes input messages from said input devices, said input devices driver separates input messages into different subsets according to the sources of said input devices that generates said input messages, for the first subset of said input message, said input devices driver generates input devices event message and converts it to data usable for computer operating system or application programs, said input devices driver also reads in other subsets of said input messages;

an operating system interface software, wherein said operating system interface software reads and interprets data of other subset of said input messages from said input devices driver, said operating system interface software decodes said input messages from said input devices driver, said operating system interface software generates input devices event message and converts it to data usable for computer operating system or application programs;

plurality of independent cursors and control points, wherein said cursors and control points are generated, respectively according to different said input devices, by said operating system interface software and said input devices driver, positions, movements, and states of said cursors and control points are controlled, respectively, by said operating system interface software and said input devices driver;

an input device aware program, wherein said input device aware program is designed for users to utilize functions of said input devices, said input device aware program interprets data, respectively, from said operating system interface software and said input devices driver; and a plurality of input device aware objects, wherein said input device aware objects are under control of said input device aware program, said input device aware program sends said input devices event message to said input device aware objects.

14. A computer interface system for using a plurality of independent input devices and for generating a plurality of independent cursors and control points, comprising:

a user interface;

a plurality of independent input devices, wherein said input devices are connected to said user interface; an operating system interface software, wherein said operating system interface software reads and interprets data from said input devices, said operating system interface software recognizes and separates the input message into different subsets according to different sources of said input devices, said operating system interface software decodes said input messages from said input devices for each said subset, said operating system interface software generates input devices event message for each said subset and converts it to data usable for computer operating system or application programs;

a plurality of independent cursors and control points, wherein said cursors and control points are generated by said operating system interface software, each of said cursors and control points are generated independently and corresponds to each said input devices, positions, movements, and states of said cursors and control points are controlled by said operating system interface software;

an input device aware program, wherein said input device aware program is designed for users to utilize functions of said input devices, said input device aware program interprets data from said operating system interface software; and a plurality of input device aware objects, wherein said input device aware objects are under control of said input device aware program, said input device aware program sends said input devices event message to said input device aware objects.

* * * * *